(12) United States Patent
Sugiura (10) Patent No.: US 12,344,123 B2
(45) Date of Patent: Jul. 1, 2025

(54) COOLING SYSTEM OF POWER STORAGE DEVICE

(71) Applicant: TOYOTA JIDOSHA KABUSHIKI KAISHA, Toyota (JP)

(72) Inventor: Yosuke Sugiura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 663 days.

(21) Appl. No.: 17/730,512

(22) Filed: Apr. 27, 2022

(65) Prior Publication Data

US 2022/0388427 A1  Dec. 8, 2022

(30) Foreign Application Priority Data

Jun. 3, 2021 (JP) ................. 2021-093537

(51) Int. Cl.
*B60L 58/26* (2019.01)
*B60K 11/06* (2006.01)
*H01M 10/613* (2014.01)
*H01M 10/625* (2014.01)
*H01M 10/63* (2014.01)
*H01M 10/6563* (2014.01)

(52) U.S. Cl.
CPC ............ *B60L 58/26* (2019.02); *B60K 11/06* (2013.01); *H01M 10/613* (2015.04); *H01M 10/625* (2015.04); *H01M 10/63* (2015.04); *H01M 10/6563* (2015.04); *H01M 2220/20* (2013.01)

(58) Field of Classification Search
None
See application file for complete search history.

(56) References Cited

U.S. PATENT DOCUMENTS 9,673,493 B2 * 6/2017 Oshima ............... H01M 10/625

FOREIGN PATENT DOCUMENTS

| JP | H08-183322 A | 7/1996 |
| JP | 2004-281077 A | 10/2004 |
| JP | 2010-163095 A | 7/2010 |
| JP | 2013158128 A * | 8/2013 |
| JP | 2017-004849 A | 1/2017 |
| JP | 2018-095061 A | 6/2018 |
| JP | 2019-110044 A | 7/2019 |

OTHER PUBLICATIONS

Aritome, JP-2013158128-A, Aug. 15, 2013, English Translation (Year: 2013).*

* cited by examiner

*Primary Examiner* — Niki Bakhtiari
*Assistant Examiner* — Dustin Van Kirk
(74) *Attorney, Agent, or Firm* — Dinsmore & Shohl LLP (57) ABSTRACT

A cooling system for a power storage device includes a blower fan that is mounted in a vehicle along with the power storage device and that blows air in a cabin to the power storage device and a control device that controls the blower fan. The control device stops the blower fan when it is ascertained that predetermined conditions that the vehicle is in a stopped state, a current-relevant value relevant to a current of the power storage device is in a predetermined range including a value 0, the blower fan is being driven, and the temperature of the power storage device is increasing are satisfied.

5 Claims, 5 Drawing Sheets

COOLING SYSTEM OF POWER STORAGE DEVICE

CROSS-REFERENCE TO RELATED APPLICATION

This application claims priority to Japanese Patent Application No. 2021-093537 filed on Jun. 3, 2021, incorporated herein by reference in its entirety.

BACKGROUND

1. Technical Field

The disclosure relates to a cooling system of a power storage device.

2. Description of Related Art

As such a type of cooling system for a power storage device in the related art, a cooling system including a cooling fan that takes in air in a cabin and sends the taken-in air to a power storage device and an intake air temperature sensor that is provided in an intake air passage extending from an intake port of air in the cabin to the power storage device via the cooling fan has been proposed (for example, see Japanese Unexamined Patent Application Publication No. 2018-95061 (JP 2018-95061 A). In this cooling system, change control for changing a rotation speed of the cooling fan according to the temperature of the power storage device in a range equal to or less than an allowable maximum rotation speed of the cooling fan based on a vehicle speed is performed. An intake air temperature is acquired from the intake air temperature sensor when an air volume blown by the cooling fan is equal to or greater than a volume of the intake air passage from the intake port of air to the intake air temperature sensor, and the cooling fan is stopped when the intake air temperature is equal to or greater than the temperature of the power storage device. In this way, an increase in temperature of the power storage device due to the temperature in the cabin being higher than the temperature of the power storage device is curbed.

SUMMARY

In the cooling system, the intake air temperature needs to be detected from the intake air temperature sensor in order to determine whether the temperature in the cabin is higher than the temperature of the power storage device. On the other hand, in order to reduce the number of system components, or the like, there is demand for omitting the intake air temperature sensor or not using the intake air temperature detected by the intake air temperature sensor when reliability of the intake air temperature sensor is low. Accordingly, it is necessary to curb an increase in temperature of the power storage device due to the temperature in the cabin being higher than the temperature of the power storage device without providing an intake air temperature sensor or without using the intake air temperature detected by an intake air temperature sensor.

The disclosure provides a cooling system for a power storage device that can curb an increase in temperature of a power storage device due to the temperature in a cabin being higher than the temperature of the power storage device without providing a temperature sensor in an intake air passage for sending air in the cabin to the power storage device or without using a value detected by a temperature sensor when the temperature sensor is provided.

A cooling system for a power storage device according to the disclosure employs the following configurations.

According to the disclosure, there is provided a cooling system for a power storage device, including: a blower fan that is mounted in a vehicle along with the power storage device and that blows air in a cabin to the power storage device; and a control device that controls the blower fan, wherein the control device stops the blower fan when it is ascertained that predetermined conditions that the vehicle is in a stopped state, a current-relevant value relevant to a current of the power storage device is in a predetermined range including a value 0, the blower fan is being driven, and the temperature of the power storage device is increasing are satisfied.

In the cooling system for a power storage device according to the disclosure, when it is ascertained that predetermined conditions that the vehicle is in the stopped state, a current-relevant value relevant to a current of the power storage device is in a predetermined range including a value 0, the blower fan is being driven, and the temperature of the power storage device is increasing are satisfied, the blower fan is stopped. When the vehicle is in the stopped state, the current-relevant value is in the predetermined range (an amount of heat emitted from the power storage device is assumed to be sufficiently small), the blower fan is being driven, and the temperature of the power storage device is increasing, the temperature in the cabin is assumed to be higher than the temperature of the power storage device. Accordingly, when satisfaction of the predetermined conditions is ascertained, an additional increase in temperature of the power storage device due to the temperature in the cabin being higher than the temperature of the power storage device can be curbed by stopping the blower fan. Here, the "current-relevant value" includes a current, a square value of the current, a post-process value obtained by performing a relaxing process on the current or the square value thereof, and an amount of heat emitted from the power storage device obtained by multiplying the square value of the current by an internal resistance value of the power storage device.

In the cooling system for a power storage device according to the disclosure, the control device may determine that satisfaction of the predetermined conditions is ascertained when a satisfaction duration time of the predetermined conditions is equal to or greater than a predetermined time. The control device may count up a counter with duration of satisfaction of the predetermined conditions, reset the counter when the predetermined conditions are not satisfied, and determine that satisfaction of the predetermined conditions is ascertained when the counter is equal to or greater than a predetermined value. With this configuration, it is possible to more appropriately ascertain satisfaction of the predetermined conditions.

In the cooling system for a power storage device according to the disclosure, the control device may drive the blower fan when the temperature of the power storage device is equal to or greater than a first predetermined temperature after the blower fan has been stopped by ascertaining the satisfaction of the predetermined conditions, and continue to drive the blower fan until the temperature of the power storage device becomes equal to or lower than a second predetermined temperature lower than the first predetermined temperature. When the temperature of the power storage device becomes equal to or greater than the first predetermined temperature after the blower fan has been stopped by ascertaining the satisfaction of the predetermined conditions, the temperature of the power storage device does not increase due to blowing air in the cabin at a temperature higher than the temperature of the power storage device to the power storage device using the blower fan, but the temperature of the power storage is assumed to increase for other reasons. Accordingly, it is possible to curb overheating of the power storage device by driving the blower fan.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure will be described below with reference to the accompanying drawings.

Figure 1:
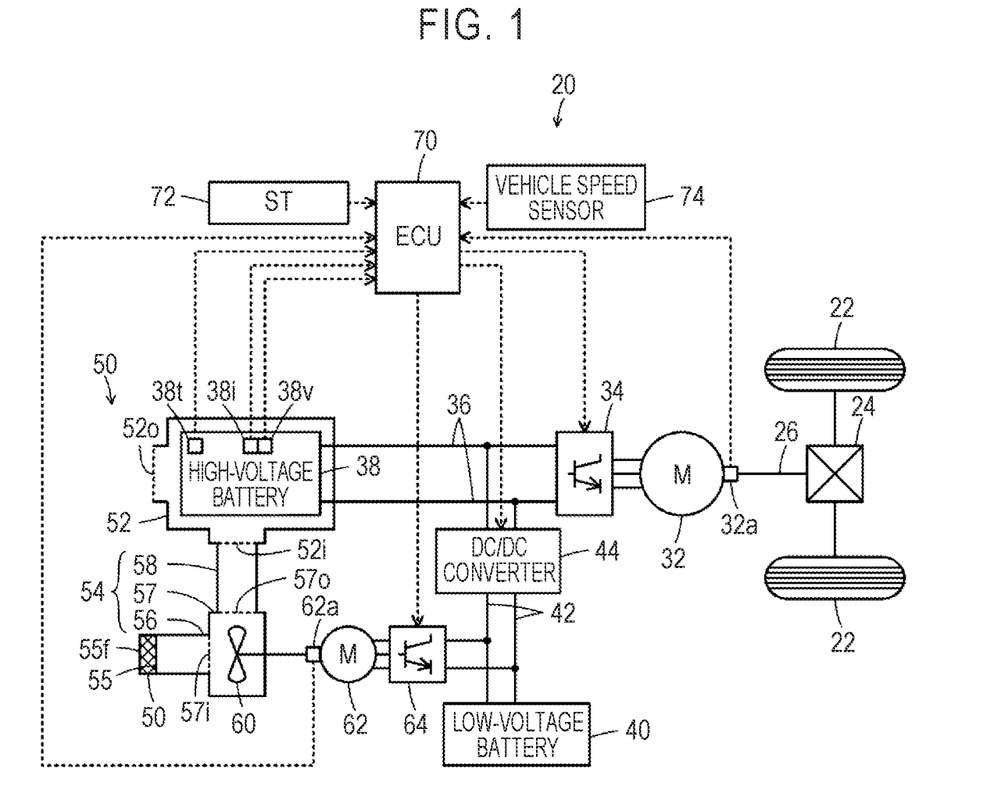
FIG. 1 is a diagram schematically illustrating a configuration of an electric vehicle 20 including a cooling system for a power storage device according to an embodiment of the disclosure.

FIG. 1 is a diagram schematically illustrating a configuration of an electric vehicle 20 including a cooling system of a power storage device according to an embodiment of the disclosure. The electric vehicle 20 according to the embodiment includes a traveling motor 32, a traveling inverter 34, a main battery 38 serving as a power storage device, an auxiliary machine battery 40, a DC/DC converter 44, a cooling device 50, and an electronic control unit (hereinafter referred to as an "ECU") 70. The electric vehicle 20 can charge the main battery 38 using electric power from an external power supply when a system has been turned off. A cooling system for a power storage device according to the embodiment is mainly constituted by the cooling device 50 and the ECU 70.

The traveling motor 32 is configured, for example, as a synchronous generator motor, and a rotor of the traveling motor 32 is connected to a drive shaft 26 which is connected to driving wheels 22 via a differential gear 24. The traveling inverter 34 is used to drive the traveling motor 32 and is connected to a power line 36. When a voltage is applied to the traveling inverter 34, the traveling motor 32 is rotationally driven by causing the ECU 70 to control switching of a plurality of switching elements of the traveling inverter 34. An air conditioner (a compressor) (not illustrated) that performs air conditioning in the cabin is also connected to the power line 36.

The main battery 38 is configured, for example, as a lithium-ion secondary battery or a nickel-hydride secondary battery with a rated voltage of about several hundred V and is connected to the power line 36. The main battery 38 is accommodated in a case 52. The auxiliary machine battery 40 is configured, for example, as a lithium-ion secondary battery or a nickel-hydride secondary battery with a rated voltage of 12 V or a lead storage battery and is connected to a power line 42. In addition to the auxiliary machine battery 40, a fan inverter 64 of the cooling device 50, the ECU 70, and lights, an audio system, and a navigation device which are not illustrated are also connected to the power line 42. The DC/DC converter 44 is connected to the power line 36 and the power line 42 and serves to step down electric power of the power line 36 and to supply the stepped-down electric power to the power line 42.

The cooling device 50 includes the case 52, an intake air passage 54, a blower fan 60, a fan motor 62, and a fan inverter 64. The main battery 38 and the cooling device 50 are provided in the cabin, for example, below a rear seat. An inlet 52$i$ and an outlet 52$o$ are formed in the case 52. Air blown by the blower fan 60 flows into the case 52 via the inlet 52$i$ and exchanges heat with the main battery 38. Air in the case 52 is discharged from the outlet 52$o$.

The intake air passage 54 is a passage for taking in air in the cabin from an intake port 55 and guiding the air to the inlet 52$i$ of the case 52 via the blower fan 60 and includes an intake duct 56, a casing 57 that accommodates the blower fan 60 therein, and a connection duct 58 in addition to the intake port 55. A filter 55$f$ that removes dust is attached to the intake port 55. The intake duct 56 is a passage for guiding air from the intake port 55 to an inlet 57$i$ formed in the casing 57. In addition to the inlet 57$i$ for taking in air from the intake duct 56, an outlet 57$o$ for discharging air in the casing 57 to the connection duct 58 is also formed in the casing 57. The connection duct 58 is a passage for guiding air from the casing 57 to the inlet 52$i$ of the case 52.

The blower fan 60 is configured, for example, as a sirocco fan (a multi-blade fan). The blower fan 60 sends air taken in the casing 57 from the intake duct 56 via the inlet 57$i$ to the connection duct 58 via the outlet 57$o$. The fan motor 62 is a motor that rotationally drives the blower fan 60 and is configured, for example, as a synchronous motor. The fan inverter 64 is used to drive the fan motor 62 and is connected to the power line 42. When a voltage is applied to the fan inverter 64, the fan motor 62 (the blower fan 60) is rotationally driven by causing the ECU 70 to control switching of a plurality of switching elements of the fan inverter 64.

Although not illustrated, the ECU 70 includes a microcomputer including a CPU, a ROM, a RAM, a flash memory, input and output ports, and a communication port. Signals from various sensors are input to the ECU 70 via the input ports. Examples of the signals input to the ECU 70 include a rotational position θmr of a rotor of the traveling motor 32 from a rotational position sensor (for example, a resolver) 32$a$. The examples include a temperature Tb of the main battery 38 from a temperature sensor 38$t$, a voltage Vb of the main battery 38 from a voltage sensor 38$v$, and a current Ib of the main battery 38 from a current sensor 38$i$. The examples include a rotational position θmf of the fan motor 62 (the blower fan 60) from a rotational position sensor (for example, a resolver) 62$a$. The examples include a start signal from a start switch 72, a shift position SP from a shift position sensor (not illustrated) that detects an operation position of a shift lever (not illustrated), an accelerator operation amount Acc from an accelerator pedal position sensor (not illustrated) that detects an amount of depression of an accelerator pedal (not illustrated), a brake pedal position from a brake pedal position sensor (not illustrated)

that detects an amount of depression of a brake pedal (not illustrated), and a vehicle speed V from a vehicle speed sensor 74.

Various control signals are output from the ECU 70 via the output port. Examples of the signals output from the ECU 70 include a control signal for the traveling inverter 34, a control signal for the DC/DC converter 44, and a control signal for the fan inverter 64. The ECU 70 calculates a rotation speed Nmr of the traveling motor 32 based on the rotational position θmr of the rotor of the traveling motor 32 from the rotational position sensor 32a and calculates a rotation speed Nmf of the fan motor 62 (a rotation speed Nf of the blower fan 60) based on the rotational position θmf of the rotor of the fan motor 62 from the rotational position sensor 62a. The ECU 70 calculates a state of charge SOC of the main battery 38 based on an integrated value of the current Ib of the main battery 38 from the current sensor 38i and sets allowable input and output electric power Win and Wout of the main battery 38 (where the electric power discharged from the main battery 38 has a positive value) based on the temperature Tb of the main battery 38 from the temperature sensor 38t and the state of charge SOC. The allowable input electric power Win of the main battery 38 is in a range equal to or less than zero and is set such that the absolute value decreases as the state of charge SOC increases and the absolute value thereof becomes less in an area in which the temperature Tb is higher than a threshold value Tbhi than in an area in which the temperature Tb is equal to or lower than the threshold value Tbhi. The allowable output electric power Wout of the main battery 38 is in a range equal to or greater than zero and is set such that the absolute value thereof decreases as the state of charge SOC decreases and the absolute value thereof becomes less in the area in which the temperature Tb is higher than the threshold value Tbhi than in the area in which the temperature Tb is equal to or lower than the threshold value Tbhi.

In the electric vehicle 20 according to the embodiment having the aforementioned configuration, the ECU 70 sets a required torque Td* required for traveling (required for the drive shaft 26) based on the accelerator operation amount Acc and the vehicle speed V, and sets a temporary torque Tmtmp which is a temporary value of a torque command Tm* of the traveling motor 32 such that the set required torque Td* is output to the drive shaft 26. The ECU 70 sets allowable upper-limit and lower-limit torque Tmin and Tmax of the traveling motor 32 by dividing the allowable input and output electric power Win and Wout of the main battery 38 by the rotation speed Nmr of the traveling motor 32. The ECU 70 sets the torque command Tm* of the traveling motor 32 by limiting the temporary torque Tmtmp of the traveling motor 32 to the allowable upper-limit and lower-limit torque Tmin and Tmax, and controls switching of the plurality of switching elements of the traveling inverter 34 such that the traveling motor 32 is driven in accordance with the torque command Tm*.

Figure 2:
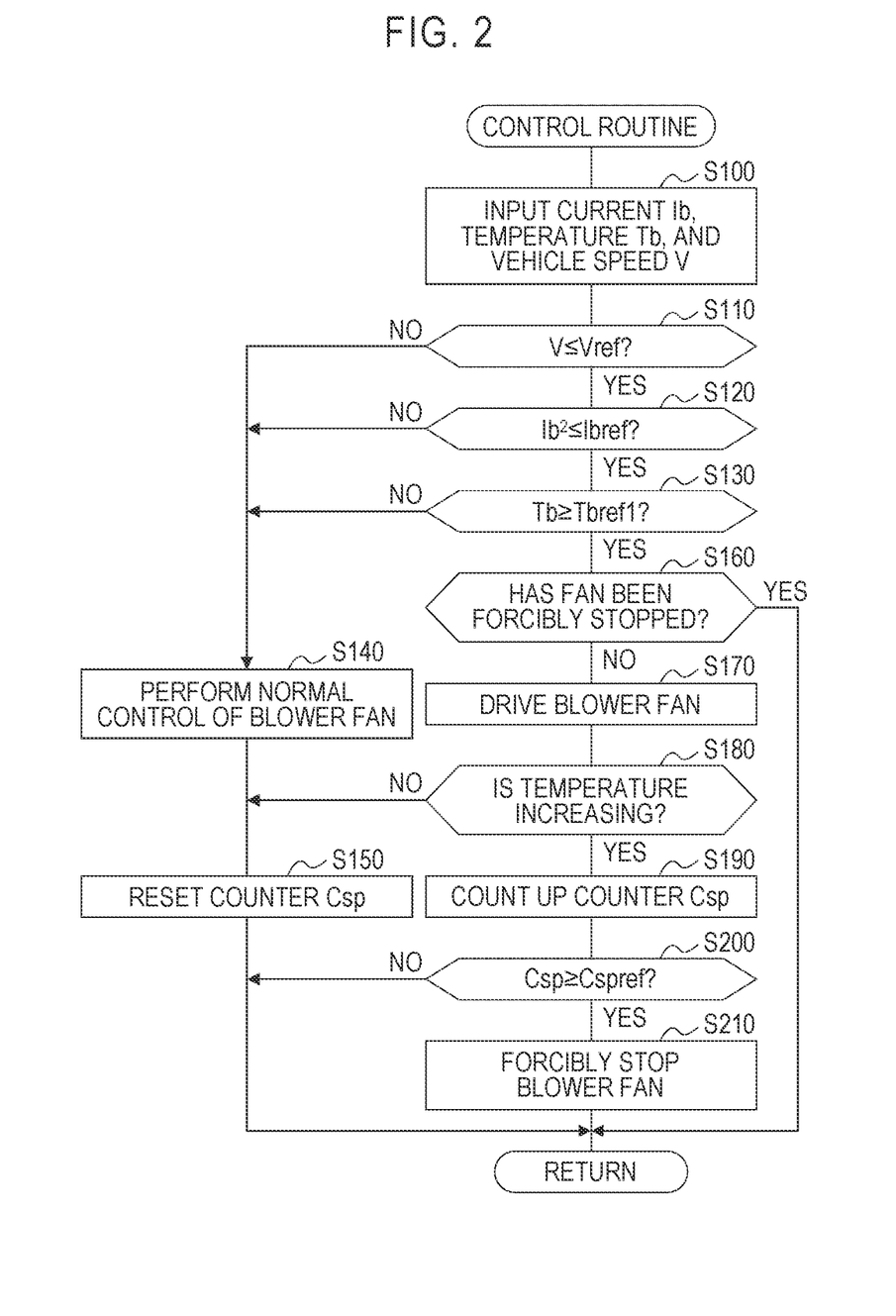
FIG. 2 is a flowchart illustrating an example of a control routine which is performed by an ECU 70.

Operation of a cooling system for the power storage device, particularly, control of the blower fan 60, which is provided in the electric vehicle 20 according to the embodiment will be described below. FIG. 2 is a flowchart illustrating an example of a control routine which is performed by the ECU 70. This routine is repeatedly performed.

When the control routine illustrated in FIG. 2 is performed, the ECU 70 first receives data such as the temperature Tb and the current Ib of the main battery 38 and the vehicle speed V (Step S100). Here, a value detected by the temperature sensor 38t is input as the temperature Tb of the main battery 38. A value detected by the current sensor 38i is input as the current Ib of the main battery 38. A value detected by the vehicle speed sensor 74 is input as the vehicle speed V.

When data is input in this way, the ECU 70 determines whether a stopped-state condition that the vehicle is in a stopped state is satisfied based on the vehicle speed V (Step S110), determines whether a small heat emission condition that an amount of heat emitted from the main battery 38 is as small as not affecting an increase in temperature thereof is satisfied based on the current Ib of the main battery 38 (Step S120), and determines whether a driving temperature condition that driving of the blower fan 60 is required to cool the main battery 38 is satisfied based on the temperature Tb of the main battery 38 (Step S130).

The process of Step S110 is performed by determining whether the vehicle speed V is equal to or lower than a threshold value Vref. For example, 0 km/h or a value slightly higher than zero is used as the threshold value Vref. The process of Step S120 is performed by determining whether a square value of the current Ib of the main battery 38 is equal to or less than a threshold value Ibref, and, for example, a square value of about several A is used. The threshold value Ibref is set based on specifications of the main battery 38, particularly, a heat capacity thereof. The process of Step S130 is performed by determining whether the temperature Tb of the main battery 38 is equal to or higher than a threshold value Tbref1. The threshold value Tbref1 is set based on specifications of the main battery 38 and, for example, a temperature of 30° C. to 40° C. is used.

When it is determined in Step S110 that the stopped-state condition is not satisfied, when it is determined in Step S120 that the small heat emission condition is not satisfied, and when it is determined in Step S130 that the driving temperature condition is not satisfied, the ECU 70 performs normal control of the blower fan 60 (Step S140), resets a counter Csp to a value 0 (Step S150), and ends this routine. Here, the counter Csp indicates a duration time when the stopped-state condition, the small heat emission condition, and the driving temperature condition are satisfied, the blower fan 60 is being driven, and the temperature of the main battery 38 is increasing.

The normal fan control is performed as follows. The ECU 70 starts driving of the blower fan 60 when the temperature Tb of the main battery 38 is equal to or higher than the threshold value Tbref1 while the blower fan 60 (the fan motor 62) is in the stopped state, and stops driving of the blower fan 60 when the temperature Tb of the main battery 38 is equal to or lower than a threshold value Tbref2 lower than the threshold value Tbref1 while the blower fan 60 is being driven. The threshold value Tbref1 is a threshold value which is used to determine whether the driving temperature condition is satisfied while the blower fan 60 is in the stopped state. The threshold value Tbref2 is a threshold value which is used to determine whether the stopped-state condition that stopping of the blower fan is required is satisfied while the blower fan 60 is being driven. For example, a value which is lower several ° C. than the threshold value Tbref1 is used as the threshold value Tbref2.

When the blower fan 60 is being driven, the following fan driving control is performed. The ECU 70 sets a target rotation speed Nf* of the blower fan 60 (the fan motor 62) based on the temperature Tb of the main battery 38 and the vehicle speed V, and controls switching of the plurality of switching elements of the fan inverter 64 such that the blower fan 60 rotates at the target rotation speed Nf*. The target rotation speed Nf* can be set, for example, by limiting a temporary rotation speed Nftmp based on the temperature Tb of the main battery 38 to an allowable upper-limit rotation speed Nfmax based on the vehicle speed V. The temporary rotation speed Nftmp is set such that it increases as the temperature Tb of the main battery 38 increases. This is for cooling the main battery 38 based on the temperature Tb. The allowable upper-limit rotation speed Nfmax is set such that it increases as the vehicle speed V increases. This is because noise based on driving of the blower fan 60 or the fan motor 62 is more lost in road noise or the like as the vehicle speed V increases.

When it is determined in Step S110 that the stopped-state condition is satisfied, it is determined in Step S120 that the small heat emission condition is satisfied, and it is determined in Step S130 that the driving temperature condition is satisfied, the ECU 70 determines whether the blower fan 60 is to be forcibly stopped (Step S160). Forcible stopping of the blower fan 60 is performed through the process of Step S210 which will be described later. When it is determined that the blower fan 60 is not to be forcibly stopped, the ECU 70 starts driving of the blower fan 60 or continues to drive the blower fan 60 (Step S170). When the blower fan 60 is driven, the fan driving control is performed.

Subsequently, the ECU 70 determines whether the temperature of the main battery 38 is increasing (Step S180). This process can be performed, for example, by determining whether a current value of the temperature Tb of the main battery 38 is higher than a previous value thereof. When the stopped-state condition, the small heat emission condition, and the driving temperature condition are satisfied and the blower fan 60 is being driven, the main battery 38 can be basically cooled by blowing air in the cabin to the case 52 using the blower fan 60. However, when the temperature in the cabin is higher than the temperature Tb of the main battery 38 and air with a temperature higher than the temperature Tb of the main battery 38 is blown to the case 52 using the blower fan 60 such as when the cabin is heated by an air conditioner (not illustrated) that can operate using electric power from the power line 36 (the main battery 38), the temperature Tb of the main battery 38 may increase. The process of Step S180 is a process which is performed in consideration of this situation.

When it is determined in Step S180 that the temperature of the main battery 38 is not increasing, the ECU 70 resets the counter Csp to zero (Step S150) and ends this routine. In this case, it is assumed that the main battery 38 is cooled by blowing air in the cabin to the case 52 using the blower fan 60. Thereafter, when at least one of the stopped-state condition, the small heat emission condition, and the driving temperature condition is not satisfied, the ECU 70 performs the normal control of the blower fan 60.

When it is determined in Step S180 that the temperature of the main battery 38 is increasing, the ECU 70 counts up the counter Csp by 1 (Step S190) and determines whether the counter Csp is equal to or greater than a threshold value Cspref (Step S200). As described above, when the stopped-state condition, the small heat emission condition, and the driving temperature condition are satisfied, the blower fan 60 is being driven, and air with a temperature higher than the temperature Tb of the main battery 38 is blown to the case 52 using the blower fan 60, the temperature Tb of the main battery 38 can increase. The threshold value Cspref is a counter value corresponding to a period of time required for ascertaining whether the stopped-state condition, the small heat emission condition, and the driving temperature condition are satisfied, whether the blower fan 60 is being driven, and whether the temperature of the main battery 38 is increasing and a period of time required for determining that the temperature of the main battery 38 is increased by blowing air with a temperature higher than the temperature Tb of the main battery 38 to the case 52 using the blower fan 60. For example, a counter value corresponding to several minutes to several tens of minutes is used as the threshold value Cspref. An example of the case in which the stopped-state condition, the small heat emission condition, and the driving temperature condition are satisfied, the blower fan 60 is being driven, and the temperature of the main battery 38 is increasing is a case in which an operator checks the vehicle while heating the cabin using the air conditioner (not illustrated) in a dealer shop or a repair shop. When it is determined in Step S200 that the counter Csp is less than the threshold value Cspref, the ECU 70 ends this routine.

When it is determined in Step S200 that the counter Csp is equal to or greater than the threshold value Cspref, the ECU 70 determines that it has been ascertained that the stopped-state condition, the small heat emission condition, and the driving temperature condition are satisfied, the blower fan 60 is being driven, and the temperature of the main battery 38 is increasing, and determines that the temperature of the main battery 38 is increased by blowing air with a higher temperature than the temperature Tb of the main battery 38 to the case 52 using the blower fan 60. Then, the ECU 70 forcibly stops the blower fan 60 (Step S210) and ends this routine. Accordingly, it is possible to curb an additional increase in temperature of the main battery 38 due to the temperature in the cabin being higher than the temperature Tb of the main battery 38 without providing a temperature sensor in the intake air passage 54 or without using a value detected by a temperature sensor when the temperature sensor is provided. Thereafter, when all of the stopped-state condition, the small heat emission condition, and the driving temperature condition are satisfied, the ECU 70 determines that the blower fan 60 is to be forcibly stopped in Step S160 and ends this routine.

Figure 3:
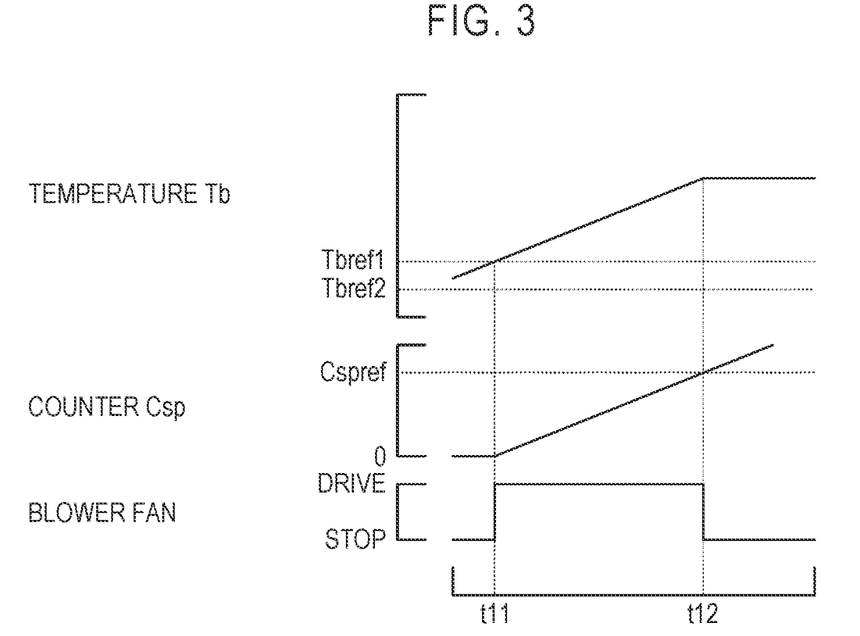
FIG. 3 is a diagram illustrating an example of a temperature Tb of a main battery 38 and an operation state of a blower fan 60 when a stopped-state condition and a small heat emission condition are satisfied.

FIG. 3 is a diagram illustrating an example of the temperature Tb of the main battery 38 and an operation state of the blower fan 60 when the stopped-state condition and the small heat emission condition are satisfied. As illustrated in the drawing, when the temperature Tb of the main battery 38 is equal to or greater than the threshold value Tbref1 and the driving temperature condition is satisfied while the blower fan 60 is in the stopped state (time t11), the ECU 70 starts driving of the blower fan 60. The ECU 70 counts up the counter Csp with an increase in temperature of the main battery 38 while the blower fan 60 is being driven, and forcibly stops the blower fan 60 when the counter Csp is equal to or greater than the threshold value Cspref (time t12). Accordingly, it is possible to curb an additional increase in temperature of the main battery 38 due to the temperature in the cabin being higher than the temperature Tb of the main battery 38 without providing a temperature sensor in the intake air passage 54 or without using a value detected by a temperature sensor when the temperature sensor is provided.

In the cooling system for a power storage device provided in the electric vehicle 20 according to the embodiment, when it is ascertained that the stopped-state condition, the small heat emission condition, and the driving temperature condition are satisfied, the blower fan 60 is being driven, and the temperature of the main battery 38 is increasing, the blower fan 60 is forcibly stopped. Accordingly, it is possible to curb an additional increase in temperature of the main battery 38 due to the temperature in the cabin being higher than the temperature Tb of the main battery 38 without providing a temperature sensor in the intake air passage 54 or without using a value detected by a temperature sensor when the temperature sensor is provided.

In the cooling system for a power storage device according to the embodiment, the ECU 70 determines whether the stopped-state condition is satisfied by determining whether the vehicle speed V is equal to or lower than the threshold value Vref. However, whether the stopped-state condition is satisfied may be determined by determining whether the absolute value of the rotation speed Nmr of the traveling motor 32 is equal to or less than a threshold value Nmrref, determining whether the rotation speed Nd of the drive shaft 26 is equal to or less than a threshold value Ndref, or determining whether the rotation speed Nw of the driving wheels 22 is equal to or less than a threshold value Nwref.

In the cooling system for a power storage device according to the embodiment, the ECU 70 determines whether the small heat emission condition is satisfied by determining whether the square value of the current Ib of the main battery 38 is equal to or less than the threshold value Ibref. However, whether the small heat emission condition is satisfied may be determined by determining whether a post-process value Ibsc obtained by performing a relaxing process such as an averaging process or a rate process on the square value of the current Ib of the main battery 38 is equal to or less than a threshold value Ibref2, determining whether the absolute value of the current Ib of the main battery 38 is equal to or less than a threshold value Ibref3, or determining whether an absolute value of a post-process value Ibsc2 obtained by performing a relaxing process on the current Ib of the main battery 38 is equal to or less than a threshold value Ibref4. Whether the small heat emission condition is satisfied may be determined by determining whether an amount of heat Qb emitted from the main battery 38 obtained by multiplying the square value of the current Ib of the main battery 38 by an internal resistance value of the main battery 38 is equal to or less than a threshold value Qbref1 or determining whether a post-process value Qbsc obtained by performing a relaxing process on the amount of heat Qb emitted from the main battery 38 is equal to or less than a threshold value Qbref2.

Figure 4:
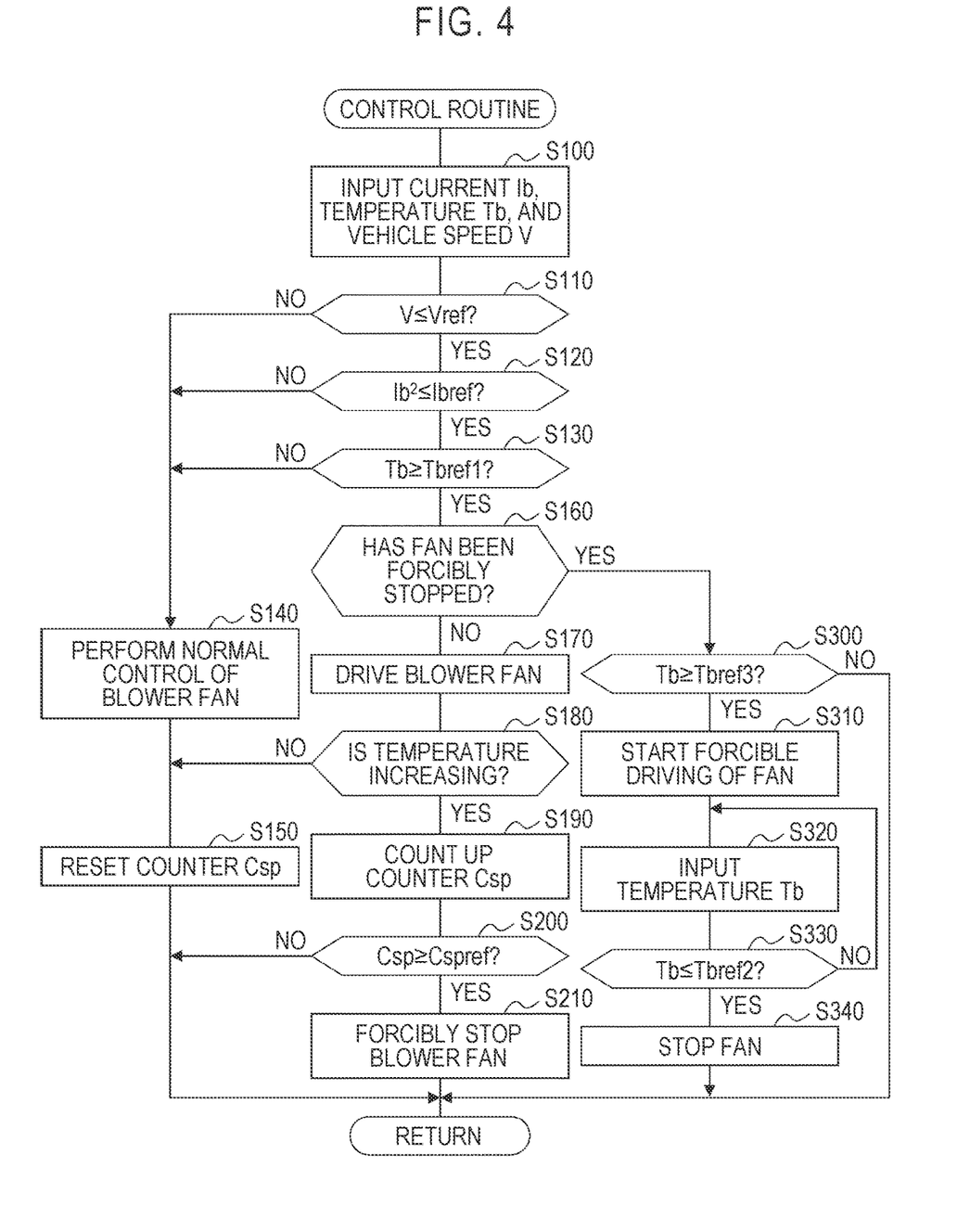
FIG. 4 is a flowchart illustrating an example of a control routine which is performed by the ECU 70.

In the cooling system for a power storage device according to the embodiment, the ECU 70 performs the control routine illustrated in FIG. 2. However, a control routine illustrated in FIG. 4 may be performed instead. The control routine illustrated in FIG. 4 is the same as the control routine illustrated in FIG. 2 except that the processes of Steps S300 to S340 are added. Accordingly, the same process steps in the control routine illustrated in FIG. 4 as in the control routine illustrated in FIG. 2 will be referred to by the same step numbers and detailed description thereof will be omitted.

In the control routine illustrated in FIG. 4, when it is determined in Step S180 that the blower fan 60 is to be forcibly stopped, the ECU 70 determines whether the temperature Tb of the main battery 38 is equal to or greater than a threshold value Tbref3 greater than the threshold value Tbref1 (Step S300). Here, the threshold value Tbref3 is set to a temperature slightly lower than an overheating temperature of the main battery 38 and, for example, a temperature which is higher several tens of ° C. than the threshold value Tbref1 and close to the threshold value Tbhi is used. When the blower fan 60 has been forcibly stopped and the temperature Tb of the main battery 38 increases further and becomes equal to or greater than the threshold value Tbref3, the increase in temperature of the main battery 38 is not caused by blowing air with a higher temperature than the temperature Tb of the main battery 38 to the case 52 using the blower fan 60, but the increase in temperature of the main battery 38 is caused for another reason. An example of the other reason is an erroneous operation of a heater (not illustrated) that can increase the temperature of the main battery 38 using electric power from the power line 42 (the auxiliary machine battery 40). The process of Step S300 is a process of determining whether an increase in temperature of the main battery 38 is caused for such other reasons. When it is determined in Step S300 that the temperature Tb of the main battery 38 is less than the threshold value Tbref3, the ECU 70 ends this routine.

When it is determined in Step S300 that the temperature Tb of the main battery 38 is equal to or greater than the threshold value Tbref3, the ECU 70 determines that the increase in temperature of the main battery 38 is caused for the other reason and starts forcible driving of the blower fan 60 (Step S310). When the blower fan 60 is forcibly driven, the fan driving control is performed. Accordingly, it is possible to curb overheating of the main battery 38. It is also possible to curb a problem due to the temperature Tb of the main battery 38 being higher than the threshold value Tbhi, for example, a problem in that the absolute values of the allowable input and output electric power Win and Wout of the main battery 38 decrease small enough not to satisfactorily exhibit performance of the main battery 38. Subsequently, the ECU 70 receives the temperature Tb of the main battery 38 (Step S320) and determines whether the input temperature Tb of the main battery 38 is equal to or less than the threshold value Tbref2 (Step S330). When it is determined that the temperature Tb of the main battery 38 is greater than the threshold value Tbref2, the ECU 70 cause the routine to return to step S320. The processes of Steps S320 and S330 are repeatedly performed in this way, and the ECU 70 stops the blower fan 60 (Step S340) and ends this routine when it is determined in Step S340 that the temperature Tb of the main battery 38 is equal to or less than the threshold value Tbref2.

Figure 5:
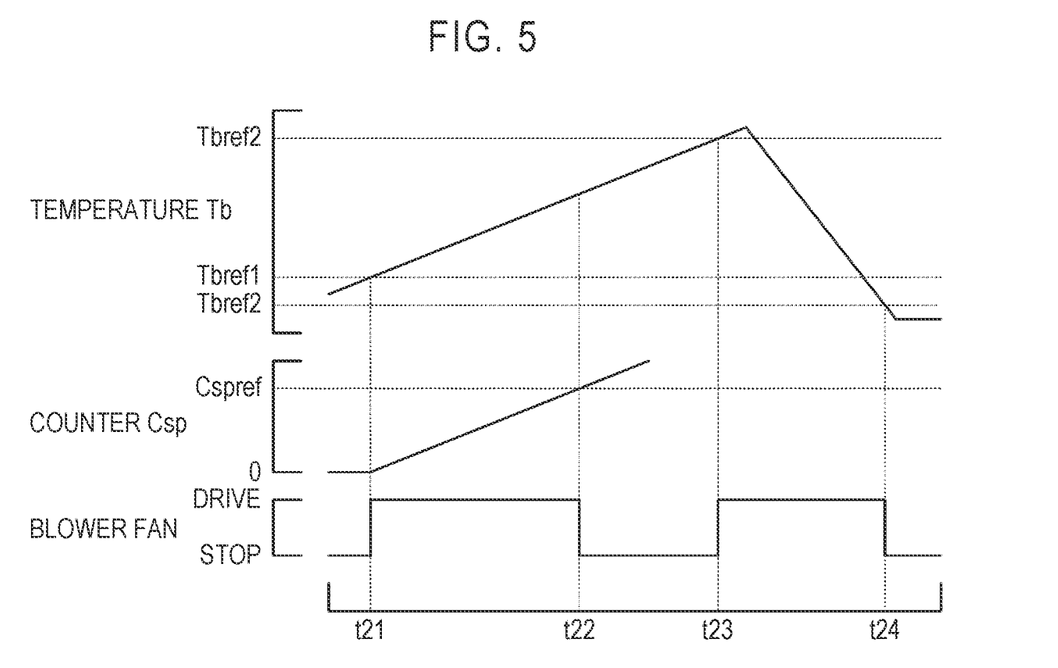
FIG. 5 is a diagram illustrating an example of the temperature Tb of the main battery 38 and the operation state of the blower fan 60 when the stopped-state condition and the small heat emission condition are satisfied.

FIG. 5 is a diagram illustrating an example of the temperature Tb of the main battery 38 and the operation state of the blower fan 60 when the stopped-state condition and the small heat emission condition are satisfied. As illustrated in the drawing, when the temperature Tb of the main battery 38 is equal to or greater than the threshold value Tbref1 and the driving temperature condition is satisfied while the blower fan 60 is in the stopped state (time t21), the ECU 70 starts driving of the blower fan 60. The ECU 70 counts up the counter Csp with the increase in temperature of the main battery 38 while the blower fan 60 is being driven, and forcibly stops the blower fan 60 when the counter Csp is equal to or greater than the threshold value Cspref (time t22). When the blower fan 60 is forcibly stopped and the temperature Tb of the main battery 38 increases further and becomes equal to or greater than the threshold value Tbref3 (time t23), the ECU 70 determines that the increase in temperature of the main battery 38 is caused for the other reason, and starts forcible driving of the blower fan 60. Accordingly, it is possible to curb overheating of the main battery 38. When the temperature Tb of the main battery 38 is equal to or less than the threshold value Tbref2 while the blower fan 60 is forcibly being driven (time t24), the ECU 70 stops the blower fan 60.

The embodiment is based on the configuration of the electric vehicle 20 including the traveling motor 32 and the main battery 38. However, the disclosure may be based on a configuration of a hybrid vehicle including an engine in addition to the traveling motor and the main battery 38. The disclosure may also be based on a configuration of a fuel-cell vehicle including a fuel cell in addition to the traveling motor and the main battery 38.

Correspondence between the principal elements in the embodiment and the principal elements described in the SUMMARY will be described below. In the embodiment, the blower fan 60 corresponds to a "blower fan" and the ECU 70 corresponds to a "control device."

Since the correspondence between the principal elements in the embodiment and the principal elements described in the SUMMARY is only an example for specifically describing the embodiment of the disclosure described in the SUMMARY, the correspondence does not limit the elements of the disclosure described in the SUMMARY. That is, the disclosure described in the SUMMARY should be construed based on the description therein, and the embodiment is only a specific example of the disclosure described in the SUMMARY.

While a mode for carrying out the disclosure has been described above with reference to the embodiment, the disclosure is not limited to the embodiment and can be modified in various forms without departing from the gist of the disclosure.

The disclosure is applicable to production industries of a cooling system for a power storage device or the like.

What is claimed is:

1. A cooling system for a power storage device, comprising:
    a blower fan that is mounted in a vehicle along with the power storage device and that blows air in a cabin to the power storage device; and
    a control device that controls the blower fan,
    wherein the control device stops the blower fan when it is ascertained by the control device that predetermined conditions that the vehicle is in a stopped state, a current-relevant value relevant to a current of the power storage device is in a predetermined range including a value 0, the blower fan is being driven, and the temperature of the power storage device is increasing are satisfied.

2. The cooling system for a power storage device according to claim 1, wherein the control device determines that satisfaction of the predetermined conditions is ascertained when a satisfaction duration time of the predetermined conditions is equal to or greater than a predetermined time.

3. The cooling system for a power storage device according to claim 1, wherein the control device counts up a counter with duration of the satisfaction of the predetermined conditions, resets the counter when the predetermined conditions are not satisfied, and determines that satisfaction of the predetermined conditions is ascertained when the counter is equal to or greater than a predetermined value.

4. The cooling system for a power storage device according to claim 1, wherein the control device drives the blower fan when the temperature of the power storage device is equal to or greater than a first predetermined temperature after the blower fan has been stopped by ascertaining the satisfaction of the predetermined conditions, and continues to drive the blower fan until the temperature of the power storage device becomes equal to or lower than a second predetermined temperature lower than the first predetermined temperature.

5. The cooling system for a power storage device according to claim 1, wherein the control device ascertains that the predetermined condition that the vehicle is in the stopped state is satisfied based on a vehicle speed detected by a vehicle speed sensor.

\* \* \* \* \*